United States Patent [19]
Low et al.

[11] 3,737,181
[45] June 5, 1973

[54] DISCONNECT UNIT

[76] Inventors: George M. Low, Acting Administrator of the National Aeronautics and Space Administration with respect to an invention of; Paul Alexander, Jr., Los Angeles; Allan R. McDougal, La Crescenta, both of Calif.

[22] Filed: Feb. 24, 1971

[21] Appl. No.: 118,269

[52] U.S. Cl. .......................... 285/316, 285/DIG. 21
[51] Int. Cl. ........................................... F16l 37/18
[58] Field of Search ..................... 285/316, 315, 277, 285/322, DIG. 21, 314; 166/0.6; 287/114

[56] References Cited

UNITED STATES PATENTS

| | | | |
|---|---|---|---|
| 3,071,188 | 1/1963 | Roulins | 285/322 X |
| 3,228,715 | 1/1966 | Neilon et al. | 285/315 X |
| 2,784,987 | 3/1957 | Corcoron | 285/316 X |
| 3,284,105 | 11/1966 | Leutwyler | 285/34 X |
| 3,601,361 | 8/1971 | Hundhausen | 285/316 |

FOREIGN PATENTS OR APPLICATIONS

| | | | |
|---|---|---|---|
| 748,760 | 12/1966 | Canada | 285/277 |

*Primary Examiner*—Dave W. Arola
*Attorney*—Monte F. Mott et al.

[57] ABSTRACT

A squib-actuated disconnect characterized by an expandable collet axially extended from a first tension member for receiving in locking engagement a protuberance axially extended from a second tension member, and a gas-driven retainer of an annular configuration for releasably supporting the collet in locking engagement with the protuberance and adapted to be displaced in an axial direction in response to a firing of an associated squib for thus accommodating a disengagement of the protuberance and the collet.

5 Claims, 7 Drawing Figures

PATENTED JUN 5 1973 3,737,181
SHEET 1 OF 2
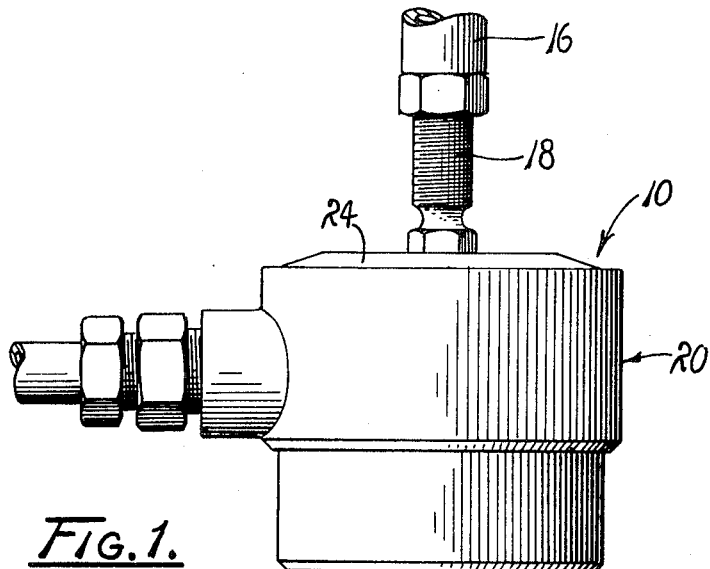
FIG.1.
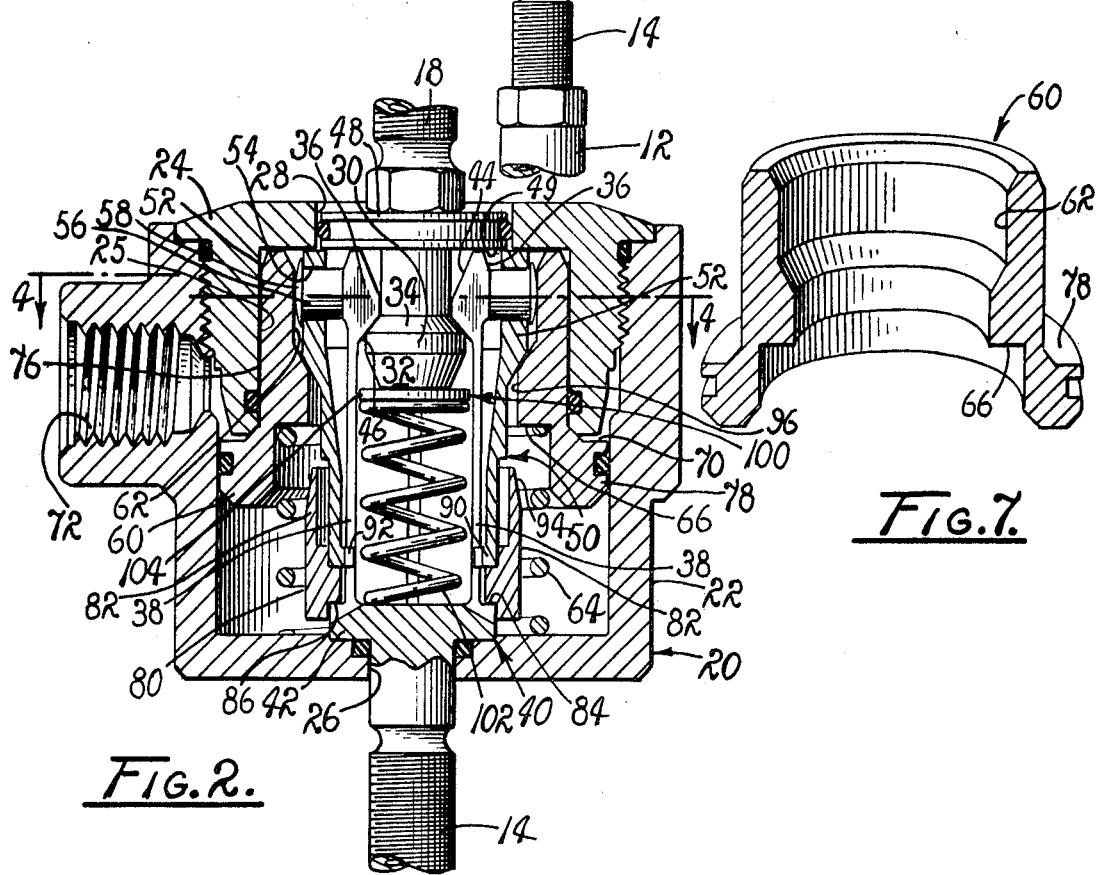
FIG.2.
FIG.7.
PAUL ALEXANDER, JR.
ALLAN R. MC DOUGAL
INVENTORS
Wilfred Griffin
Monte F. Mott
ATTORNEYS

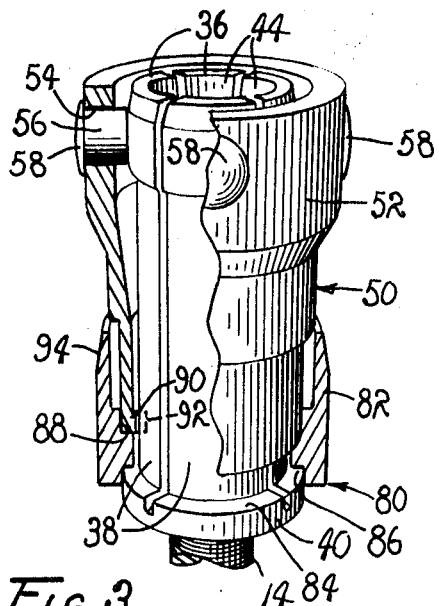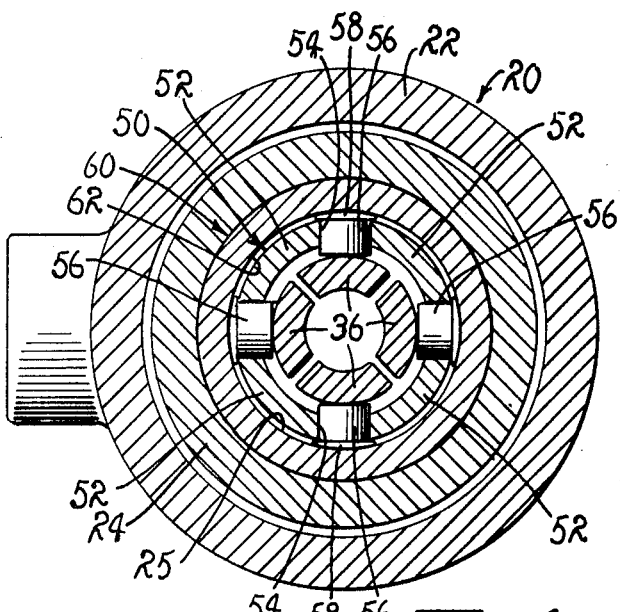

DISCONNECT UNIT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to a disconnect unit for releasably coupling a pair of coaxially related tension members, and more particularly to an hermetically sealed, squib-actuated disconnect unit for achieving separation of coupled tension members without contaminating ambient space and associated structure.

2. Description of the Prior Art

The prior art is replete with selectively actuatable disconnect units for coupling adjacent members operatively subjected to tension-developing forces. Quite often, such units are squib-actuated and are provided with gas-driven structures capable of initiating a separation function for the disconnect unit. However, where such a unit must accommodate a separating function unattended by an expulsion of gas and particles of debris, difficulty frequently is encountered in achieving sufficiently reliable separation, unattended by an expulsion of debris and gas. Such requirements are encountered at the separation of a spacecraft from its launch vehicle.

Hence, there exists a need for reliable, squib-actuated disconnect unit, suitable for use in releasably coupling a spacecraft with its launch vehicle during check-out, test-firing and launch operations, capable of functioning without contaminating or destroying delicate instrumentation of the type normally found aboard operative spacecraft.

OBJECTS AND SUMMARY OF THE INVENTION

It therefore is an object of the instant invention to provide an improved disconnect unit.

It is another object to provide a reliable disconnect unit having a high strength-to-weight ratio.

Another object is to provide a reliable, squib-operated disconnect unit having a high strength-to-volume ratio.

It is another object to provide a reliable, gas-driven disconnect unit particularly suited for use in coupling tension members in a space environment.

It is another object to provide a squib-operated disconnect unit for use in coupling a spacecraft with a launch vehicle during system check-out, test-firing and launch operations.

It is another object to provide an improved and efficient disconnect unit particularly suited for use in coupling a spacecraft with a launch vehicle and suited for use in achieving separation in an environment wherein instrumentation is protected from contamination and destruction.

These and other objects and advantages are achieved through the use of a squib-actuated disconnect unit having an hermetically sealed housing confining therein a collet including an annular array of extended fingers supported to receive and engage a protuberance axially extended from an associated tension member, and a squib-operated retainer concentrically related to the collet for maintaining the collet and the protuberance in an operative engagement and for selectively accommodating a disengagement of the collet and the protuberance in response to a firing of an associated squib.

BRIEF DESCRIPTION OF THE DRAWINGS

FIG. 1 is an external view of the squib-actuated disconnect unit which embodies the principles of the instant invention.

FIG. 2 is a cross-sectional view, on somewhat of an enlarged scale, of the disconnect unit of FIG. 1 illustrating a coupled relationship of an associated protuberance and a collet.

FIG. 3 is a fragmented perspective view of selected structural components employed by the disconnect unit of FIGS. 1 and 2.

FIG. 4 is a cross sectional view taken generally along lines 4—4 of FIG. 2, with the protuberance removed.

FIG. 5 is a cross sectional view, quite similar to FIG. 2, illustrating relative positions assumed by the protuberance and collet as separation of the disconnect unit occurs.

FIG. 6 is an enlarged view of one of the radial pins employed in the disconnect unit shown in FIGS. 1 through 5.

FIG. 7 is a sectioned perspective view of a gas-driven piston employed by the disconnect unit.

DESCRIPTION OF THE PREFERRED EMBODIMENT

Referring now to the drawings, wherein like reference characters designate like or corresponding parts throughout the several views, there is shown in FIG. 1 a disconnect unit 10 which embodies the principles of the instant invention. As shown, the unit 10 is fixed to a first tension member 12, through a coupling shaft 14, and a second tension member 16, through a disconnect shaft 18.

In practice, the disconnect unit 10 is mounted aboard a launch vehicle for a spacecraft, not shown, and fixedly secured thereto through the coupling shaft 14. The disconnect shaft 18 is fixedly coupled with the spacecraft, also not shown. Since the first and second tension members 12 and 16, respectively, form no particular part of the instant invention, a detailed description is omitted in the interest of brevity. As a practical matter, however, the first and second tension members 12 and 16, respectively, often are subjected to tension, in the magnitude of 3,000 to 5,000 pounds, in an operative environment of severe vibration which normally attends the launching of a vehicle to which an associated spacecraft is coupled.

The disconnect unit 10 includes a housing 20 of a two-piece configuration. The housing includes a cup-shaped shell 22 having internal screw-threads, not designated, for receiving therein a screw-threaded closure plug 24 for closing the housing 20. The shell 22 also includes a bore 26 through which is extended the coupling shaft 14, while the closure plug 24 includes a cup-shaped internal surface 25 and a concentric bore 28, coaxially related to the bore 26, through which is extended the disconnect shaft 18.

At the distal end of the disconnect shaft 18, there is a protuberance 30 so tapered, in fore-and-aft directions, as to be provided with a leading face 32 and a trailing face 34, each being of an annular configuration for cooperating with an annular array of locking-lugs 36. The locking-lugs 36 are provided at the distal ends of a plurality of resilient fingers 38, which together form a tubular collet 40.

As illustrated, the collet 40 is integrally related with the distal portion of the coupling shaft 14 extended through the bore 26 of the shell 22. Therefore, it should readily be apparent that simply by coupling the protuberance 30 with the collet 40, axially directed tensile forces applied to either the coupling shaft 14 or the disconnect shaft 18 is transferred through the collet 40.

In order to achieve a positive coupling of the protuberance 30 with the collet 40, the fingers 38 are formed of a flexible, high-strength material and are integrally related with a base 42. The fingers 38 extend in parallelism with the longitudinal axis of the tubular collet 40 in a manner such that the annular array of locking-lugs 36 is positioned for receiving the protuberance 30. Of course, the outside diameter of the protuberance 30 necessarily is greater than the internal diameter f the array of locking-lugs 36.

In practice, each of the locking-lugs 36 is tapered to provide a pair of leading and trailing faces 44 and 46, respectively. These faces cooperate with the leading and trailing faces 32 and 34, respectively, of the protuberance 30 in a manner such that as the protuberance 30 is forced axially into the array of locking-lugs 36, the annular face 32 of the protuberance 30 simultaneously acts against the leading face 44 of each of the locking-lugs 36 for camming the lugs in a radial displacement. Thus the collet 40 is expanded as the protuberance 30 is inserted into the collet 40. As the protuberance 30 is passed between the locking-lugs 36, the trailing faces 34 simultaneously are mated with the trailing face 46 of each of the locking-lugs 36 to thus achieve a mated relationship therebetween. So long as the fingers 38 are retained in a substantially parallel relationship with the longitudinal axis of the collet 40, the faces 34 and 46 of the protuberance and locking-lugs, respectively, are maintained in a mated, face-to-face engagement. When these faces are so mated, extraction of the protuberance 30 from the collet 40 is precluded.

As a practical matter, within the bore 28 there is seated by a closure disk 48, which concentrically is supported by the shaft 18 in a position to engage the distal ends of the fingers 38, a stop surface 49. The disk 48 thus functions as a stop member in the event an axially directed force is applied, in compression, to the shafts 14 and 18. If desired, an O-ring seal, not designated, can be provided for sealing the closure disk 48 within the bore 28.

About the collet 40 there is provided a collet retainer, generally designated 50. The retainer 50 serves to releasably retain the fingers 38 in a substantially parallel relationship with the longitudinal axis of the collet so that the adjacent faces of the protuberance 30 and the locking-lugs 36 are supported in mated engagement.

In practice, the retainer 50 includes a tubular pin-holder 52 supported in a concentric relationship with the fingers 38 of the collet 40. The pin-holder 52 includes an array of radial openings 54 circumscribing the distal ends of the fingers 38 in a manner such that each of the openings 54 is radially aligned with one of the locking-lugs 36. Within each of the openings 54 there is a pin 56 which engages an adjacent locking-lug 36 along a line extending parallel to the longitudinal axis of the collet 40. Each of these pins includes a head 58 having a configuration conforming to a segment of a sphere and supported by the surfaces of the openings for axial reciprocation. Consequently, as the array of locking-lugs 36 is expanded, due to passage of the protuberance 30 therethrough, the pins 56 simultaneously are displaced in a radial direction relative to the longitudinal axis of the collet 40. Therefore, radial expansion of the array of lugs 36 always is attended to an radial displacement of the pins 56. So long as an radial displacement of the pins 56 is precluded, expansion of the array of locking-lugs 36 is precluded.

In order to preclude a radial expansion of the array of lugs 36, for thus precluding extraction of the protuberance 30 from the collet 40, movement of the pins 56 simultaneously is blocked by an axially displaceable piston 60. The piston 60 is of an annular configuration and includes stop-surface 62, also of an annular configuration, concentrically related to the array of openings 54 and simultaneously engages the heads 58 of the pins 56, in a circumscribing and line engagement. So long as the stop-surface 62 is concentrically related to the array of openings 54 expansion of the array of locking-lugs 36 thus is precluded. However, in order to accommodate an insertion, or extraction of the protuberance 30 with respect to the array of locking-lugs 36, of the collet 40, the piston 60 axially is displaced toward the base 42 of the collet for thus withdrawing the stop-surface 62 from a circumscribing engagement with the heads 58 of the pins 56. Once withdrawal of this surface is achieved, radial movement is afforded for the pins 56 and an expansion of the array of lugs 36 thus is accommodated.

In order to ensure a seating of the piston 60 in a concentric relationship with the openings 54, so that the stop-surface 62 is caused to circumscribe and engage the heads 58 of the pins 56, a compression spring 64 is seated within the shell 22 and engages an annular shoulder 66 formed about the internal surface of the piston 60. The spring 64 simultaneously and continuously acts against the internal surface of the bottom of the cup-shaped shell 22 and the shoulder 66 for urging the body 60 toward a seated disposition with respect to the distal ends of the fingers 38. However, it is important to note that the body 60 is of a length sufficient to permit the stop-surface 62 to be axially displaced out of engagement with the heads 58 of the pins 56, as best illustrated in FIG. 5.

In a circumscribing relationship with the piston 60 there is formed an axially expandable chamber 70 of an annular configuration. This chamber is in direct communication with a squib receptical 72 and is, in effect, defined by the circumscribing internal surface of the shell 22, the terminal, external surface of the closure plug 24, and the external surface 74 of the piston 60, as best illustrated in FIG. 5. The surfaces of the closure plug 24 and the shell 22 defining the chamber 70 are maintained in a mutually fixed relationship, while the external surface 74 of the piston 60 is afforded axial displacement as the volume of the chamber 70 is expanded.

The external surface 74 of the piston 60 includes a cylindrical segment 76 and an integrally related radial surface 78 circumscribing a base portion of the piston. The cylindrical segment 76 is afforded axial displacement with respect to the internal surface 25 of the closure plug 24, as the radial segment 78 is displaced in an axial direction. Hence, the volume of the chamber 70 is operatively expanded, as the piston 60 axially is displaced, for displacing the annular stop-surface 62, from engagement with the heads 58 of the pins 56.

In order to effect an expansion of the volume of the chamber 70, for thus displacing the piston 60 with respect to the array of openings 54, a pyrotechnic device, such as an electrically initiated squib, not shown, is seated for firing within a squib receptical 72. Expanding gas generated by a firing of the squib is delivered to the chamber 70 and acts upon the surface segment 78 of the external surface 74 of the piston 60 for forcing the piston in displacement against the applied forces of the compression spring 64. As expansion of the chamber 70 thus is achieved, the annular stop-surface 62 simultaneously is disengaged from the surfaces of the heads 58 of the pins 56 seated in the array of openings 54 of the pin-holder 52. Disengagement of the stop-surface 62 serves to release the pins 56 for radial displacement so that the locking-lugs 36 responsively are released for radial displacement to accommodate an expansion of the array of locking-lugs 36. Of course, in the presence of tension in the shafts 14 and 18, an expansion of the annular array of locking-lugs 36 permits the protuberance 30 to be withdrawn from the collet 40.

As a practical matter, it is often desirable to provide the unit 10 with a snubbing mechanism 80 for arresting axial displacement of the piston 60. This mechanism includes a sleeve 82, formed of a malleable metal, supported by an annular shoulder 84, circumscribing the base 42 of the collet 40, mated with an internal annular shoulder 86 provided within the sleeve 82.

In practice, the sleeve 82 further includes an internal surface 88 which circumscribes and confines therewithin an annular base 90 provided for the pin-holder 52. The base 90 includes radially extended protrusions 92 suitably seated within openings, not designated, formed in fingers 38 of the collet 40. Consequently, a mutual supporting relationship is established between the sleeve 82 and the pin-holder 52.

The external distal surface of the sleeve 82 is inwardly tapered to provide a wedging surface 94 having an annular face axially displaced from a cooperating surface 96 formed within the body 60. A positioning of the surface 94 is such as to intercept and frictionally engage the surface 96 as the piston 60 is advanced against the forces of the spring 64 in response to an initiation of a squib supported within the squib receptical 72. As the chamber 70 thus is expanded in response to an introduction of gas from the receptical 72, the surfaces 94 and 96 are brought into a wedging, face-to-face engagement. Preferably, the relationship of the dimensions of the wedging surfaces 94 and 96 are such that the sleeve 82 is inwardly deformed, as the piston 60 is advanced, for absorbing the energy present in the advancing piston. In operation, once a squib within the receptical 72 is fired, the piston 60 is driven to and arrested in a position wherein the stop-surface 62 is withdrawn from engagement with the head 58 of the pin 56 for accommodating an axial extraction of the protuberance 30 from the collet 40.

So long as a force of a sufficient magnitude is applied in tension to the shafts 14 and 18, axial separation from the protuberance 30 and collet 40 readily is achievable once the pins 56 are released for radial displacement. However, in the event it is found desirable to do so, an ejector 100 can be employed for forcibly ejecting the protuberance 30 from the collet 40, through the annular array of locking-lugs 36. The ejector 100 preferably includes a compression spring 102 concentrically seated within the collet 40 and terminating in a contiguous relationship with an ejector plate 104. The spring 106 is provided with a spring constant and an operative length sufficient to force the ejector plate into a continuous engagement with the protuberance 30 whereby the spring 102 continuously acts against the protuberance 30. Once the piston 60 is advanced against applied force of the springs 64, through a distance sufficient for withdrawing the stop-surfaces 62 from engagement with the heads 58 and the pins 56, the ejector 100 is rendered effective for ejecting the protuberance 30 from the collet 40, for thus assuring separation.

OPERATION

It is believed that in view of the foregoing description, the operation of the device will be readily understood and it will be briefly reviewed at this point.

With the disconnect unit 10 assembled in the manner hereinbefore described, a coupling of the protuberance 30 with the collet 40 manually is achievable by threadingly removing the closure plug 24, forcing the piston in displacement against the spring 64, and inserting the protuberance 30 into the collet through the annular array of locking-lugs 36 and subsequently reseating both the piston and the closure plug 24. Of course, gas delivered through the squib receptical also can be employed for displacing the piston 60 against the spring 64 for accommodating an insertion of the protuberance 30 within the collet 40.

In any event, when thus assembled, a squib is threaded into the squib receptical 72 and prepared for firing in response to an electrical signal applied thereto. At an appropriate instant, when separation of the protuberance 30 from the collet 40 is desired, the squib is fired, whereupon heated and expanding gases are introduced into the chamber 70 causing the chamber 70 to expand for driving the piston 60 against the force of the compression spring 64 through a distance sufficient to be arrested by the deformable sleeve 82.

Displacement of the piston 60 thus effected causes the stop-surface 62 to be withdrawn from circumscribing engagement with the heads 58 of the pins 56 whereupon a spring 102 acting through the plate 104, against the protuberance 30, accompanied by axial forces applied in opposition to the shafts 14 and 18, serves to advance the protuberance 30 in an ejecting direction for thus radially expanding the annular array of locking-lugs 36. Thus extraction of the protuberance 30 is accommodated so that a total disassociation of the tension members 12 and 16 is achieved.

It is important to note that the gases generated by the firing of a squib within the receptical 72 are retained within the chamber 70 so that any substantial discharge of debris and hot gases is precluded whereby contamination of adjacent instrumentation is avoided.

In view of the foregoing, it should readily be apparent that the disconnect unit of the instant invention is a compact, lightweight, highly reliable and efficient unit having particular utility in an environment wherein an operational discharge of debris preferably is avoided.

Although the invention has been herein shown and described in what is conceived to be the most practical and preferred embodiment, it is recognized that depar-

What is claimed is:

1. In a disconnect unit the improvement comprising:
    A. an elongated coupling member;
    B. an extensible collet of a cylindrical configuration including a plurality of resilient fingers extended from and connected to a common base and supported in an operative position thereby telescopically receiving said elongated coupling member in locking engagement;
    C. a collet retainer of a tubular configuration mounted on said collet and supported thereby, in a concentric relationship therewith, including an annular array of radially extended openings arranged in a circumscribing relationship with the distal end portions of said fingers, and a plurality of radially displaceable support pins seated in said openings and radially extended into depressing engagement with said fingers;
    D. means including an axially reciprocable piston of a substantially cylindrical configuration concentrically related to said collet member and supported for axial displacement into confining engagement with said plurality of pins for supporting the pins against radial displacement within said opening;
    E. an axially compressible spring continuously urging the piston into said confining engagement with said array of pins;
    F. means integral with said piston defining an annular pressure face circumscribing said piston for providing an axially displaceable wall of a concentric, axially expansible and hermetically sealed chamber;
    G. means for supporting a pyrotechnic device in operative communication with said chamber for delivering heated gas under pressure to the chamber for driving the piston into an axially displaced relationship with said array of pins; and
    H. a shock absorber concentrically related to said collet and axially spaced from said plurality of pins for receiving and arresting axial displacement of the piston as it is driven into said axially displaced relationship with said array of pins.

2. The improvement of claim 1 further comprising:
    A. an annular array of locking-lugs including a locking-lug inwardly projected from the distal end of each of said fingers;
    B. means defining a protuberance integral with said coupling member extended into locking engagement with said array of locking-lugs;
    C. a housing confining the collet and the collet retainer;
    D. means defining within said housing an opening coaxially related to the array of opposed locking-lugs; and
    E. means including a spring-biased ejector concentrically supported within said collet for ejecting the protuberance from said housing.

3. A releasable squib-actuated disconnect unit for releasably coupling a pair of coaxially related tension members, comprising:
    A. means including a protuberance coaxially extended from a first tension member;
    B. means coaxially extended from a second tension member including an expandable collet of a cylindrical configuration formed of a plurality of flexible fingers integrally related through an annular base and terminating at their distal ends in an annular array of opposed locking-lugs for receiving said protuberance in locking engagement;
    C. a pin-holder of a tubular configuration mounted on said collet and supported thereby including means defining therein an annular array of radial openings circumscribing said fingers in concentric relation with said annular array of locking-lugs;
    D. means including a reciprocable piston having an internal annular surface concentrically related to said pin-holder and supported for axial displacement from a first position wherein said surface circumscribes said array of openings to a second position wherein said surface is axially displaced from said array of openings;
    E. a plurality of radially extended, displaceable pins, each seated in one opening of said annular array of openings and extended into supporting engagement with one finger of said plurality of fingers and having a head engaging said annular surface of the piston when said piston is in said first position for supporting said array of pins against radial displacement, whereby said locking-lugs are supported against radial displacement;
    F. means including a compression spring operatively associated with said piston for urging said piston toward said first position;
    G. means integral with the piston defining an annular wall of an expansible chamber circumscribing said piston;
    H. means for delivering gas under pressure to said chamber for advancing said piston from said first position into said second position, whereby the pins are released for radial displacement relative to said collet; and
    I. means including a shock absorber for arresting axial displacement of the piston as it is advanced into said second position.

4. A disconnect unit of claim 3 wherein the chamber is hermetically sealed and said gas is developed in response to a firing of a squib associated therewith and said shock absorber is a deformable cylinder coaxially related to said piston and supported in an intercepting relationship with the piston as it is advanced into said second position.

5. The disconnect unit of claim 4 further comprising an ejector including a spring-loaded plate concentrically related to said collet and coaxially related to said protuberance continuously urging said protuberance in axial displacement from said collet.

* * * * *